United States Patent
Hodges et al.

(10) Patent No.: US 11,693,385 B2
(45) Date of Patent: Jul. 4, 2023

(54) AUTOMATED SLOT ADJUSTMENT TOOL

(71) Applicant: Walmart Apollo, LLC, Bentonville, AR (US)

(72) Inventors: Timothy Ryan Hodges, Bentonville, AR (US); Christopher Wade Spencer, Garfield, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 17/568,137

(22) Filed: Jan. 4, 2022

(65) Prior Publication Data

US 2022/0128963 A1    Apr. 28, 2022

Related U.S. Application Data

(63) Continuation of application No. 16/428,590, filed on May 31, 2019, now abandoned.

(60) Provisional application No. 62/679,388, filed on Jun. 1, 2018.

(51) Int. Cl.
*G05B 19/18* (2006.01)
*G06Q 10/087* (2023.01)

(52) U.S. Cl.
CPC ......... *G05B 19/182* (2013.01); *G06Q 10/087* (2013.01); *G05B 2219/35167* (2013.01)

(58) Field of Classification Search
CPC ............................ G06Q 10/087; G05B 19/182
See application file for complete search history.

(56) References Cited

U.S. PATENT DOCUMENTS

| | | |
|---|---|---|
| 7,437,305 B1 | 10/2008 | Kantarjiev |
| 7,533,036 B2 | 5/2009 | Bamberg |
| 8,285,584 B2 | 10/2012 | Fotteler |
| 8,571,915 B1 | 10/2013 | Wong |
| 8,650,100 B1 | 2/2014 | Miller |
| 8,700,443 B1 | 4/2014 | Murray |

(Continued)

FOREIGN PATENT DOCUMENTS

| | | |
|---|---|---|
| WO | 0125876 A2 | 4/2001 |
| WO | 2014164829 | 10/2014 |

(Continued)

OTHER PUBLICATIONS

Bühler, Dominic et al.; "Model-based delivery cost approximation in attended home services"; Computers & Industrial Engineering; Aug. 2016; vol. 98; Elsevier; <https://doi.org/10.1016/j.cie.2016.05.014>; 3 pages.

(Continued)

*Primary Examiner* — Andre D Boyce
(74) *Attorney, Agent, or Firm* — Fitch, Even, Tabin & Flannery, LLP

(57) ABSTRACT

Systems, methods, and machine readable media are provided for slot capacity adjustment. A utilization rate of a facility for a plurality of time slots is determined. Slots having a utilization rate that can have an associated capacity increased are identified and the capacity for the slots having a utilization rate that can be increased is increased. Slots having a utilization rate that can have an associated capacity decreased are identified and these slots have their capacity decreased. A slot-to-slot capacity variance of greater than a smoothing threshold are identified and smoothed. A capacity schedule is produced based on the capacity increases, capacity decreases, and capacity smoothing.

15 Claims, 17 Drawing Sheets

(56) References Cited

U.S. PATENT DOCUMENTS

| | | |
|---|---|---|
| 9,633,389 B2 | 4/2017 | Carr |
| 9,659,079 B2 | 5/2017 | Vasantham |
| 9,697,547 B2 | 7/2017 | Borders |
| 9,805,402 B1 | 10/2017 | Maurer |
| 10,482,421 B1 | 11/2019 | Ducrou |
| 10,719,799 B1 | 7/2020 | Harris |
| 2002/0143655 A1 | 10/2002 | Elston |
| 2003/0177072 A1 | 9/2003 | Bared |
| 2004/0107110 A1 | 6/2004 | Gottlieb |
| 2005/0197949 A1 | 9/2005 | Welter |
| 2005/0216357 A1 | 9/2005 | Wittmer |
| 2007/0187183 A1 | 8/2007 | Saigh |
| 2009/0063251 A1 | 3/2009 | Rangarajan |
| 2011/0225023 A1 | 9/2011 | Evens |
| 2011/0288895 A1 | 11/2011 | Perez, Jr. |
| 2012/0022900 A1 | 1/2012 | Thakkar |
| 2012/0078673 A1 | 3/2012 | Koke |
| 2014/0279665 A1 | 9/2014 | Lievens |
| 2014/0330739 A1 | 11/2014 | Falcone |
| 2014/0359092 A1 | 12/2014 | Middleton |
| 2014/0372161 A1 | 12/2014 | Ulrich |
| 2016/0063604 A1 | 3/2016 | Shaffer |
| 2016/0110735 A1 | 4/2016 | Brereton |
| 2016/0196524 A1 | 7/2016 | Ito |
| 2017/0083967 A1 | 3/2017 | Shiely |
| 2017/0103374 A1 | 4/2017 | Bhattacharjee |
| 2017/0193586 A1 | 7/2017 | Yuan |
| 2017/0270545 A1 | 9/2017 | Montgomery, III |
| 2017/0323250 A1 | 11/2017 | Lindbo |
| 2018/0130015 A1 | 5/2018 | Jones |
| 2018/0134492 A1 | 5/2018 | Lert, Jr. |
| 2018/0285793 A1 | 10/2018 | Li |
| 2019/0303863 A1 | 10/2019 | Ghosh |
| 2019/0354920 A1 | 11/2019 | Farias |
| 2019/0369590 A1 | 12/2019 | Hodges |
| 2019/0370709 A1 | 12/2019 | Hodges |

FOREIGN PATENT DOCUMENTS

| | | |
|---|---|---|
| WO | 2019232411 | 12/2019 |
| WO | 2019232434 | 12/2019 |

OTHER PUBLICATIONS

International Search Report and Written Opinion for PCT/US2019/034963 dated Aug. 20, 2019, 12 pages.

Lee et al., Supply chain simulation with discrete-continuous combined modeling, Computers & Industrial Engineering 43 (2002) 375-392 (Year: 2002).

Patroklos Georgiadis et al., A system dynamics modeling framework for the strategic supply chain management of food chains, Journal of Food Engineering 70 (2005) 351-364 (Year: 2005).

PCT; App. No. PCT/US2019/034963; International Preliminary Report on Patentability dated Dec. 10, 2020; 5 pages.

PCT; App. No. PCT/US2019/034993; International Preliminary Report on Patentability dated Dec. 1, 2020; 5 pages.

PCT; App. No. PCT/US2019/034993; International Search Report and Written Opinion dated Jul. 30, 2019; 12 pages.

U.S. Appl. No. 16/428,590; Notice of Allowance dated Oct. 4, 2021; 9 pages.

U.S. Appl. No. 16/428,590; Office Action dated Jan. 6, 2021; 15 pages.

U.S. Appl. No. 16/428,590; Office Action dated Jul. 7, 2021; 16 pages.

U.S. Appl. No. 16/428,599; Office Action dated Jan. 6, 2021; 21 pages.

U.S. Appl. No. 16/428,599; Office Action dated Jan. 14, 2022; (pp. 1-18).

U.S. Appl. No. 16/428,599; Office Action dated Jul. 7, 2021; 17 pages.

U.S. Appl. No. 16/428,599; Office Action dated Oct. 19, 2021; 15 pages.

Agrawal et al, Multi-Vendor Sourcing in a Retail Supply Chain, Production and Operations Management, vol. 11 No. 2, Jun. 2002, pp. 157-182 (Year: 2002).

U.S. Appl. No. 16/428,599; Non-Final Rejection dated Mar. 29, 2022; (pp. 1-17).

U.S. Appl. No. 16/428,599; Notice of Allowance and Fees Due (PTOL-85) dated Jul. 8, 2022; (pp. 1-13).

van Donselaar et al, Ordering Behavior in Retail Stores and Implications for Automated Replenishment, Management Science May 2010, vol. 56, No. 5 (May 2010), pp. 766-784 (Year: 2010).

| SLOT | CAP | SATURDAY | SUNDAY | MONDAY | TUESDAY | WEDNESDAY | THURSDAY | FRIDAY | |
|------|-----|----------|--------|--------|---------|-----------|----------|--------|-----|
| 8 | 18 | 100% | 100% | 100% | 100% | 67% | 44% | 61% | 82% |
| 9 | 15 | 100% | 100% | 100% | 100% | 80% | 67% | 60% | 87% |
| 10 | 13 | 100% | 100% | 100% | 77% | 38% | 77% | 100% | 85% |
| 11 | 13 | 100% | 100% | 100% | 100% | 15% | 62% | 115% | 85% |
| 12 | 12 | 100% | 100% | 100% | 100% | 83% | 50% | 75% | 87% |
| 13 | 9 | 100% | 100% | 100% | 92% | 44% | 75% | 89% | 87% |
| 14 | 12 | 92% | 100% | 100% | 100% | 83% | 75% | 92% | 90% |
| 15 | 15 | 87% | 100% | 100% | 100% | 87% | 73% | 87% | 90% |
| 16 | 18 | 78% | 100% | 100% | 106% | 89% | 83% | 94% | 92% |
| 17 | 18 | 100% | 100% | 100% | 73% | 61% | 100% | 83% | 93% |
| 18 | 15 | 27% | 100% | 100% | 17% | 47% | 40% | 47% | 62% |
| 19 | 12 | 42% | 75% | 100% | 90% | 17% | 8% | 42% | 43% |
| | | 85% | 98% | 100% | 90% | 61% | 64% | 78% | |

FIG. 6

Review

1400

1401 → Store 1072 | WK: 201916
Old: 129 | New: 139

| Day | Old | New | Change |
|---|---|---|---|
| Saturday | 116 | 126 | 8.6% |
| Sunday | 126 | 123 | -2.4% |
| Monday | 119 | 109 | -8.4% |
| Tuesday | 101 | 101 | 0.0% |
| Wednesday | 96 | 88 | -8.3% |
| Thursday | 108 | 118 | 9.3% |
| Friday | 129 | 139 | 7.8% |

1402

| | |
|---|---|
| CSATGrade | Pass |
| Pre-Sub | Pass |
| Post-Sub | Pass |
| On Time Pick | Pass |

Step Up Preference

Store
2 ▼

○ Conservative

○ Normal

● Aggressive

SUBMIT

FIG. 15

AUTOMATED SLOT ADJUSTMENT TOOL

CROSS-REFERENCE TO RELATED APPLICATIONS

This application is a continuation of U.S. application Ser. No. 16/428,590, filed May 31, 2019, now abandoned, which claims priority to and the benefit of U.S. Application No. 62/679,388, filed Jun. 1, 2018, the disclosures of which are incorporated herein by reference in their entirety.

BACKGROUND

Capacity is an important aspect of a business, especially for a retail environment. In a retail environment, capacity refers to an availability of resources to satisfy demand. Capacity can depend on staffing levels as well as physical and computing resources that are available. Efficient capacity optimization helps the retail facility to operate at a peak level.

SUMMARY

In one embodiment, a computing device is configured to execute a slot capacity module. The slot capacity module, when executed, reads a first data structure stored in one or more computer-readable media to determine a utilization rate of a facility for a plurality of times slots for a plurality of days, creates a second data structure in the one or more computer-readable media to identify candidate time slots for which capacity is subject to modification based on the utilization rate associated with each of the time slots or each of the time slots for a specified day. The slot capacity module when executed modifies the second one of the plurality of data structures to at least one of remove a first subset of the candidate time slots from the new data structure, associate an increment flag with a second subset of the candidate time slots, or associate a decrement flag with a third subset of the candidate time slots. The slot capacity module when executed modifies a third data structure stored in the one or more computer-readable media to adjust the capacity for the candidate time slots associated with the increment or decrement flag, and adjusts, in the third data structure, the capacity for a fourth subset of the candidate time slots having a slot-to-slot capacity variance that exceeds a smoothing threshold. The slot capacity module when executed generates a capacity schedule in a fourth one of the plurality of data structures based on capacity increases, capacity decreases and capacity smoothing performed in the third one of the plurality of data structures.

In another embodiment, a computer-implemented method for slot capacity optimization includes determining a utilization rate of a facility for a plurality of time slots from a first data structure for a plurality of days, the utilization rate being based on a prior history of utilization rates collected over a pre-determined period of time. The method includes creating a second data structure that identifies candidate time slots from the time slots for which capacity is subject to modification based on the utilization rate associated with each of the time slots or each of the time slots for a specified day. The method further includes modifying the second one of the plurality of data structures to at least one of remove a first subset of the candidate time slots from the new data structure, associate an increment flag with a second subset of the candidate time slots, or associate a decrement flag with a third subset of the candidate time slots, and modifying a third data structure to adjust the capacity for the candidate time slots associated with the increment or decrement flag. The method additionally includes adjusting, in the third data structure, the capacity for a fourth subset of the candidate time slots having a slot-to-slot capacity variance that exceeds a smoothing threshold. The method further includes generating a capacity schedule in a fourth data structure based on capacity increases, capacity decreases and capacity smoothing performed in the third data structure.

In another embodiment, a non-transitory machine-readable medium stores instructions executable by a computing device, wherein execution of the instructions causes the computing device to implement a method for slot capacity optimization. The method includes determining a utilization rate of a facility for a plurality of time slots from a first data structure for a plurality of days, the utilization rate being based on a prior history of utilization rates collected over a pre-determined period of time. The method includes creating a second data structure that identifies candidate time slots from the time slots for which capacity is subject to modification based on the utilization rate associated with each of the time slots or each of the time slots for a specified day. The method further includes modifying the second one of the plurality of data structures to at least one of remove a first subset of the candidate time slots from the new data structure, associate an increment flag with a second subset of the candidate time slots, or associate a decrement flag with a third subset of the candidate time slots, and modifying a third data structure to adjust the capacity for the candidate time slots associated with the increment or decrement flag. The method additionally includes adjusting, in the third data structure, the capacity for a fourth subset of the candidate time slots having a slot-to-slot capacity variance that exceeds a smoothing threshold. The method further includes generating a capacity schedule in a fourth data structure based on capacity increases, capacity decreases and capacity smoothing performed in the third data structure.

BRIEF DESCRIPTION OF THE DRAWINGS

The accompanying drawings, which are incorporated in and constitute a part of this specification, illustrate one or more embodiments of the invention and, together with the description, help to explain the invention. The drawings are not necessarily to scale, or inclusive of all elements of a system, emphasis instead generally being placed upon illustrating the concepts, structures, and techniques sought to be protected herein. In the drawings:

FIG. 6 is a table showing slots, capacities, and utilization rates after implementing slot to slot smoothing, according to an example embodiment.

FIG. 14 is a review interface for recommendations, according to an example embodiment.

FIG. 15 is an interface for step up preferences, according to an example embodiment.

DETAILED DESCRIPTION

Systems and methods of the present disclosure can be utilized to provide time slot optimization to automatically manage the capacity of a retail facility. Capacity can refer to staffing levels as well as physical capacity, such as parking spaces, and physical and computing equipment. A time slot can be a specified increment of time, e.g., one hour. As a non-limiting example, a retail facility may be able to handle 100 on-line grocery orders in a day, the 100 orders spread across several time slots within the day in a certain pattern. The pattern of the time slots can be based on historical data regarding customer pick-up timing for the online grocery orders. Labor and staffing guidelines are applied to the data to confirm that the staffing can handle the demand of customers coming to the store. In certain situations, there may be a need to increase capacity for a time slot, while keeping within the guidelines. The guidelines are viewed on a regular cycle (e.g., every two weeks) and the capacity is continuously adjusted by day, and by slot for each retail facility. Capacity can be increased or decreased based on a response of the facility to user demand.

Figure 1:
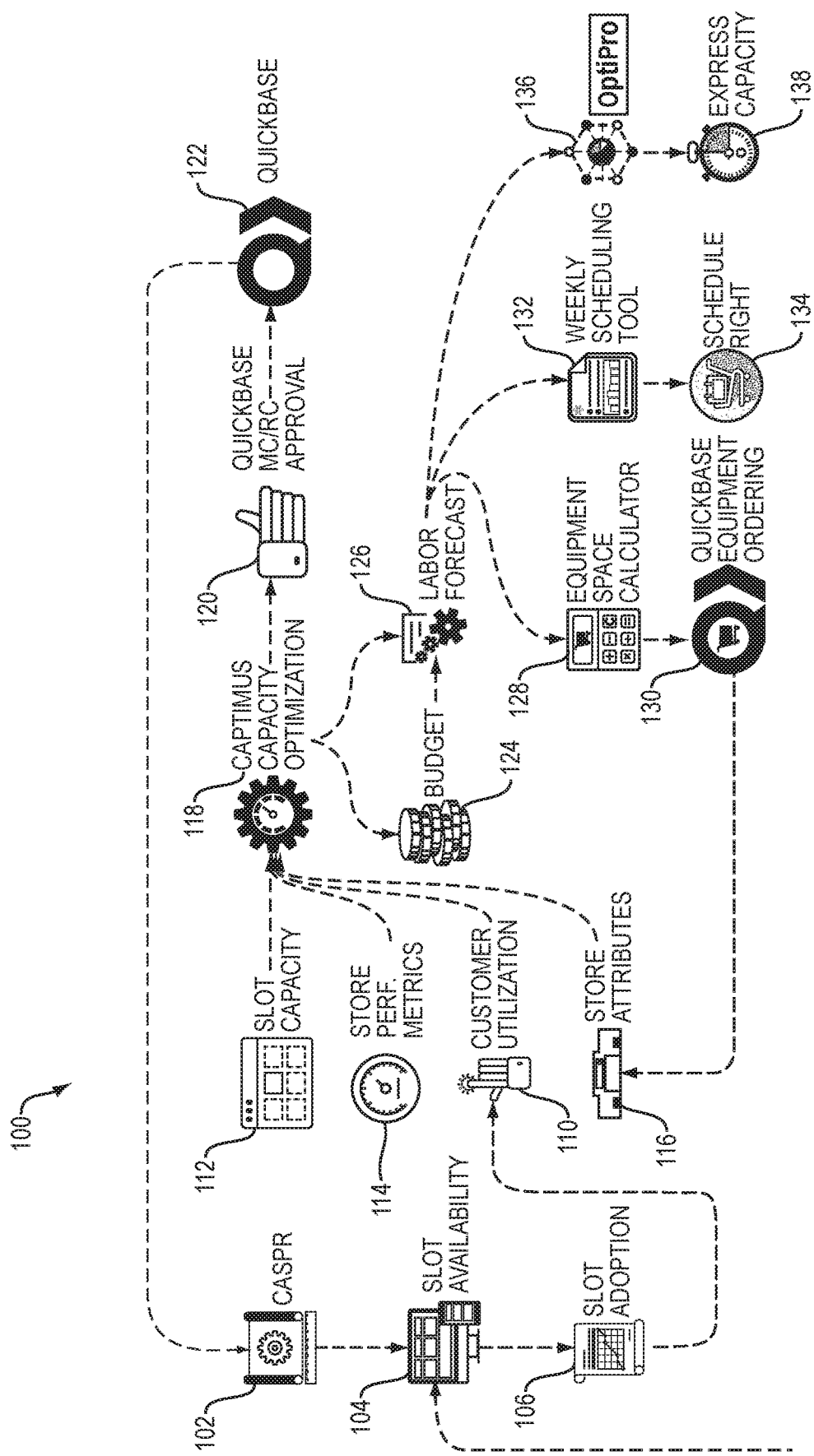
FIG. 1 is a diagram of modules and equipment for implementing slot capacity optimization, according to an example embodiment.

Referring to FIG. 1, an environment 100 is shown for providing time slot adjustment. The environment 100 can include one or more computing devices and one or more computer-readable medium configured to implement a time slot adjustment system in which a slot capacity module can be executed (objects 102, 104, 106, 110, 112, 114, 116 118). A system (102, Computer Aided Scheduling and Planning of Resources, CASPR) in the environment 100 interfaces with a webserver hosting a store website and provides particular time slot schedules and capacities for each store. A user can place an online grocery order via a store website and can select a pickup time slot for the order defined by the system 102. The information from CASPR is used to determine slot availability 104 and slot adoption 106. The historical data order data related to time slots that are available and the number of order pick-ups per time slot over a specified period of time, e.g., a four week period, is used to determine utilization 108.

The time slot adjustment environment can use the utilization data 110 and slot capacity 112 as part of the process implemented in the environment 100 for determining whether to adjust time slot capacities. The time slot adjustment process also uses store performance metrics 114. The store performance metrics include but are not limited to, customer satisfaction, availability of an item in the store, and the timeliness of the order preparation. Also included as part of the time slot adjustment process are store attributes 116 which can include retail facility storage, available equipment, the number of parking spaces, etc. All of these factors are used by into the capacity adjustment module (Captimus) 118, which outputs a recommended number of time slots per hour per day and a recommended capacity per time slot per day. The output from Captimus 118 is forwarded to a Quickbase approval module 120 where the changes are provided as an online spreadsheet type output which can be approved or rejected by one or more of a market coach (MC) and a regional coach (RC). Rejections are fed back to Captimus 118 and approved changes are forwarded to a Quickbase tool 122. Quick Base is an online database that enables users to collect, manage, and share business information.

The changes provided by the Captimus module can be used as inputs for a quarterly budget 124 and the labor forecast 126. This includes calculating the necessary equipment and space needed 128 (number of handheld devices for associates, amount of parking spaces, etc.) and utilizing Quickbase equipment ordering 130 to order necessary equipment to meet the new capacities set by Captimus. The labor forecast also drives a weekly scheduling tool 132 and a schedule right module 134 to provide the actual scheduling of employee hours. OptiPro 136 is a separate capacity adjustment system for express pickup. The express capacity module 138 details the number of people available in the store to pick the orders for express pickup.

It is important to determine if a store is performing well in terms of customer satisfaction, availability of products, and the like. Another metric is to determine of the store has the right amount of utilization of existing slots. A time slot utilization rate of, e.g., 85 percent or greater, is considered to be properly utilized. If a store is showing the ability to handle more orders for a given time slot on a given day, the capacity for that time slot can be increased. Based on the utilization numbers, a determination is made regarding whether an increase or decrease in capacity should be made, in order to provide improved performance of the store.

A smoothing process of the capacity values is performed to minimize peaks and valleys so that the time slots can be staffed properly. A capacity change from slot-to-slot of no more than a specified value, e.g., 3, is used in a particular example of the smoothing process. This prevents a situation, for example, where an associate is only scheduled to come in for one hour then has to leave, or is only scheduled to work a single day in a week.

Figure 2:
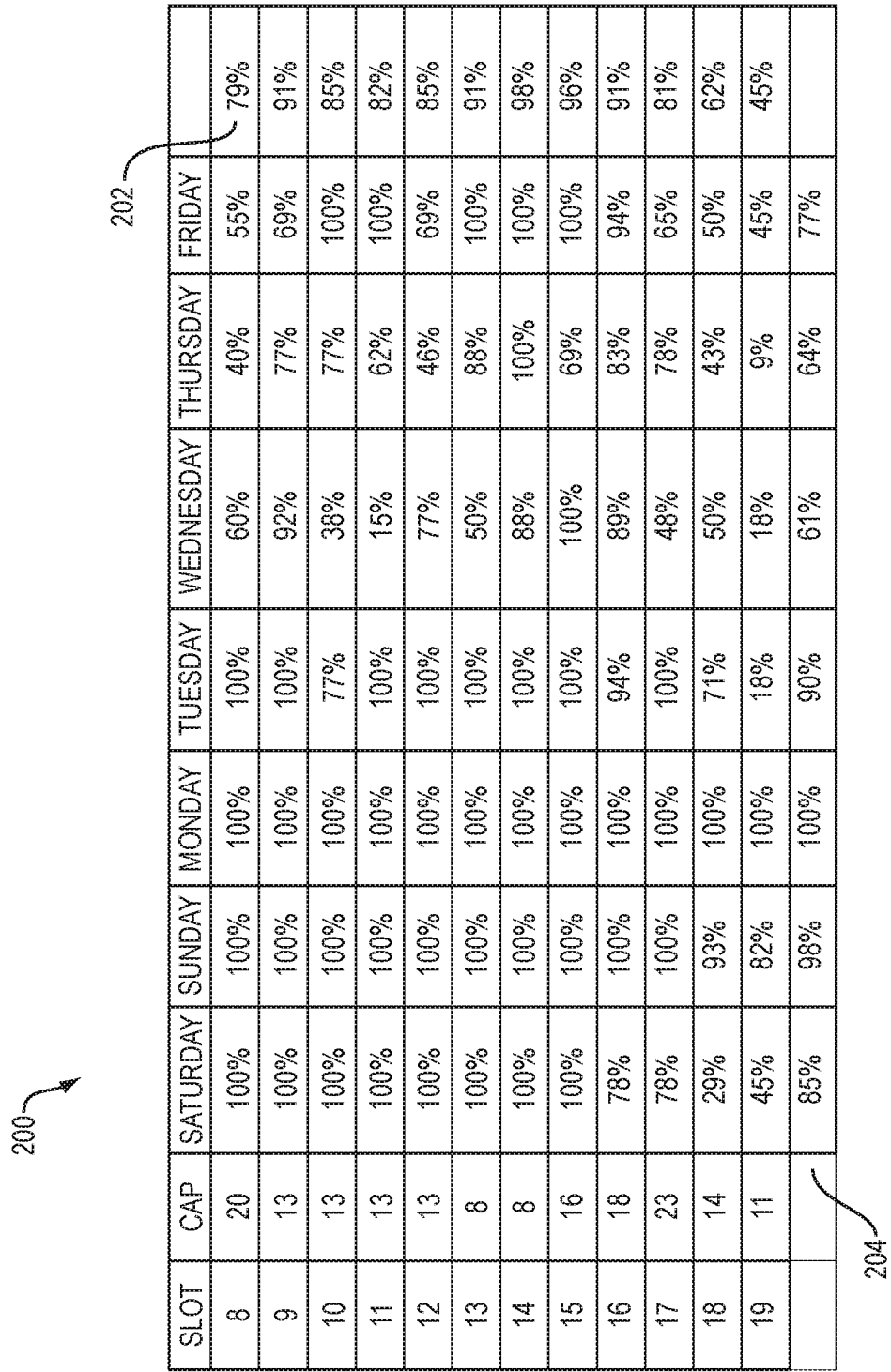
FIG. 2 is a table showing slots, capacities, and utilization rates before implementing slot capacity optimization, according to an example embodiment.

Referring now to FIG. 2, a table data structure 200 is shown. Table data structure 200 includes a column titled "Slot" which lists a series of one hour time slots (8-19) which relate to store operating hours. A second column is labeled "Cap" which refers to capacity in terms of orders being processed. The next columns are the days of the week, Saturday through Friday; each column has a utilization figure for each time slot and capacity. The utilization figure refers to the percentage of online orders being processed during that time slot. A last column 202 is the average capacity for the time slot across the days of the week. The last row 204 across the bottom of the table is the average capacity of all time slots for the day.

Figure 3:
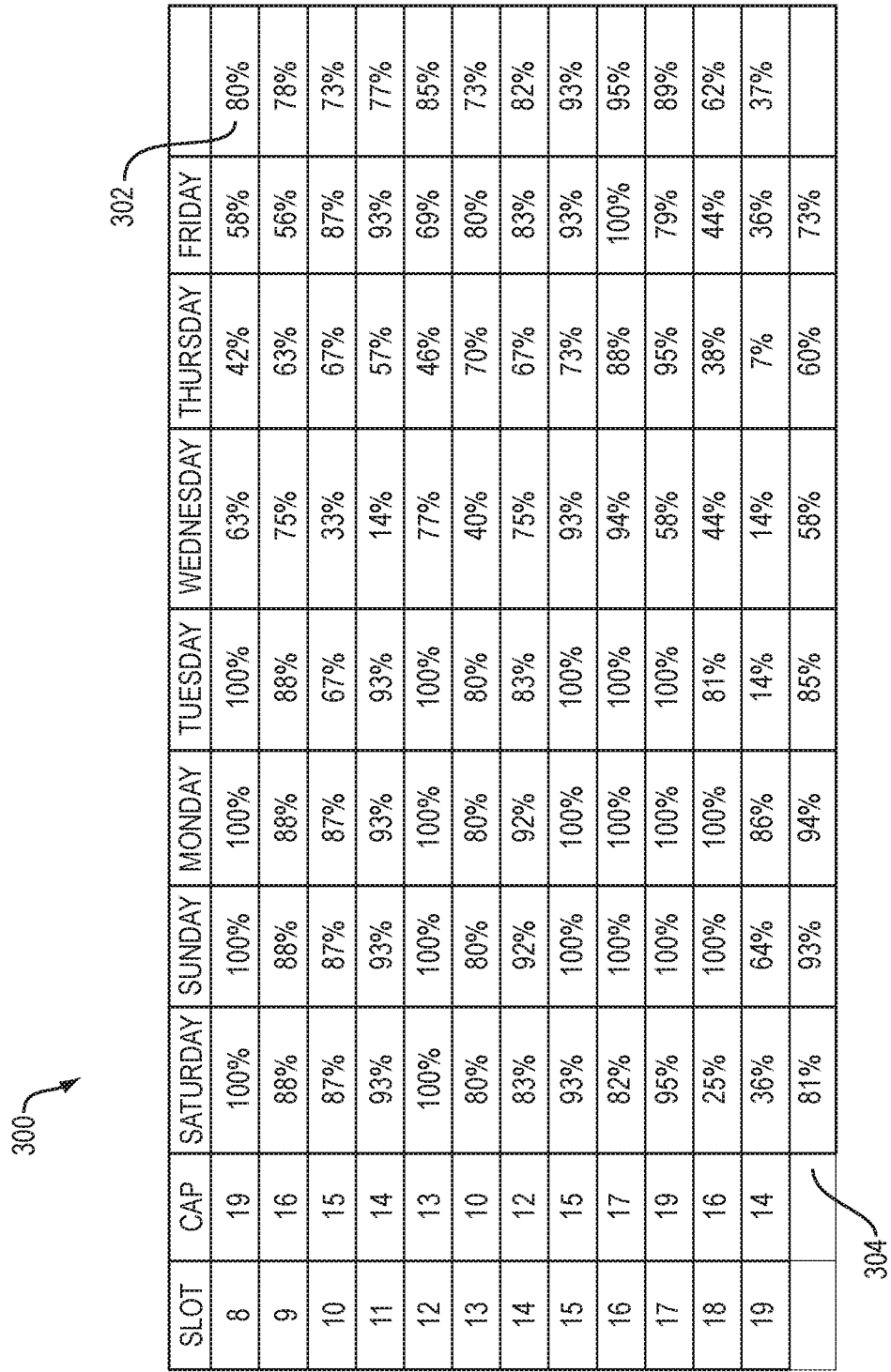
FIG. 3 is a table showing slots, capacities, and utilization rates after implementing slot capacity optimization, according to an example embodiment.

Table data structure 200 is a table of utilization before the automated slot adjustment process (sometimes referred to herein as "Captimus") has been run. Table data structure 300 of FIG. 3 is a table of utilization after the automated slot adjustment process has been run. The goal is to have the utilization average for a day or a time slot to be 85 percent or higher. Time slots having a utilization rate greater than 85 percent may be subject to a capacity increase. Time slots having a utilization rate less than 70 percent may be subject to a capacity decrease. In table data structure 200 the average utilization goal for Saturday is 85 percent. In table data structure 300, after the automated slot adjustment process has been run the average utilization rate has been lowered to 81 percent. This was accomplished by changing the capacity values for different time slots. For time slot 8, the capacity was changed from 20 to 19. The capacity for time slot 9 was changed from 13 to 16. This resulted in the utilization changing from 100 percent to 88 percent. The capacity for time slot 10 was changed from 13 to 15. This resulted in the utilization changing from 100 percent to 87 percent. The capacity for time slot 11 was changed from 13 to 14. This resulted in the utilization changing from 100 percent to 93 percent. The capacity for time slot 12 was maintained at 13. The capacity for time slot 13 was changed from 8 to 10. This resulted in the utilization changing from 100 percent to 80 percent. The capacity for time slot 14 was changed from 8 to 12. This resulted in the utilization changing from 100 percent to 83 percent. The capacity for time slot 15 was changed from 16 to 15. This resulted in the utilization changing from 100 percent to 93 percent. The capacity for time slot 16 was changed from 18 to 17. This resulted in the utilization changing from 78 percent to 82 percent. The capacity for time slot 17 was changed from 23 to 19. This resulted in the utilization changing from 78 percent to 95 percent. The capacity for time slot 18 was changed from 14 to 16. This resulted in the utilization changing from 29 percent to 25 percent. The capacity for time slot 19 was changed from 11 to 14. This resulted in the utilization changing from 45 percent to 36 percent. The overall average capacity for all time slots for Monday after being processed through the automated slot adjustment process changed from 85 percent to 81 percent. Similar changes occurred with the other daytime utilization where utilization rates over 85 percent were lowered. Sunday changed from 98 percent to 93 percent, Monday changed from 100 percent to 94 percent, and Tuesday changed from 90 percent to 85 percent. Wednesday changed from 61 percent to 58 percent, Thursday changed from 64 percent to 60 percent, and Friday changed from 77 percent to 73 percent.

There was also a concomitant change in the average slot capacity per slot. The slot capacity of slot 8 changed from 79 percent to 80 percent. The slot capacity of slot 9 changed from 91 percent to 78 percent. The slot capacity of slot 10 changed from 85 percent to 73 percent. The slot capacity of slot 11 changed from 82 percent to 79 percent. The slot capacity of slot 12 was unchanged. The slot capacity of slot 13 changed from 91 percent to 73 percent. The slot capacity of slot 14 changed from 98 percent to 82 percent. The slot capacity of slot 15 changed from 96 percent to 93 percent. The slot capacity of slot 16 changed from 91 percent to 95 percent. The slot capacity of slot 17 changed from 81 percent to 89 percent. The slot capacity of slot 18 was unchanged. The slot capacity of slot 19 changed from 45 percent to 37 percent.

Figure 4:
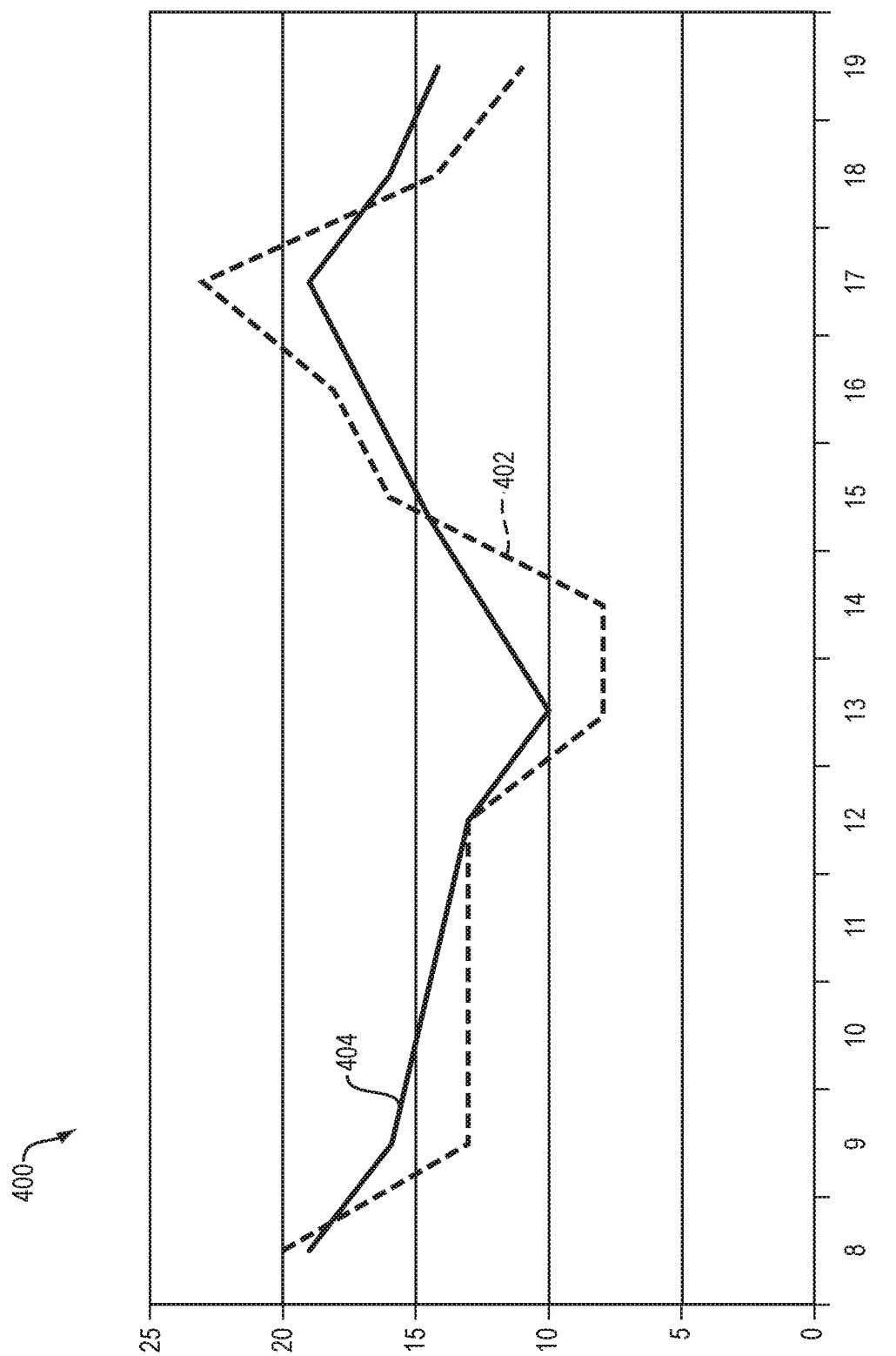
FIG. 4 is a graph showing capacity versus time slots before and after the implementing slot capacity optimization according to an example embodiment.

FIG. 4 shows a graph data structure 400 having a vertical axis of capacity and a horizontal access of time slots. Line 402 shows the capacity values over time before running the automated slot adjustment process, and has several large slope and amplitude changes. Line 404 shows the capacity values over time after running the automated slot adjustment process, and shows how the amplitude and slope have been changed to a line having smaller peaks and less abrupt slope changes.

Figure 5:
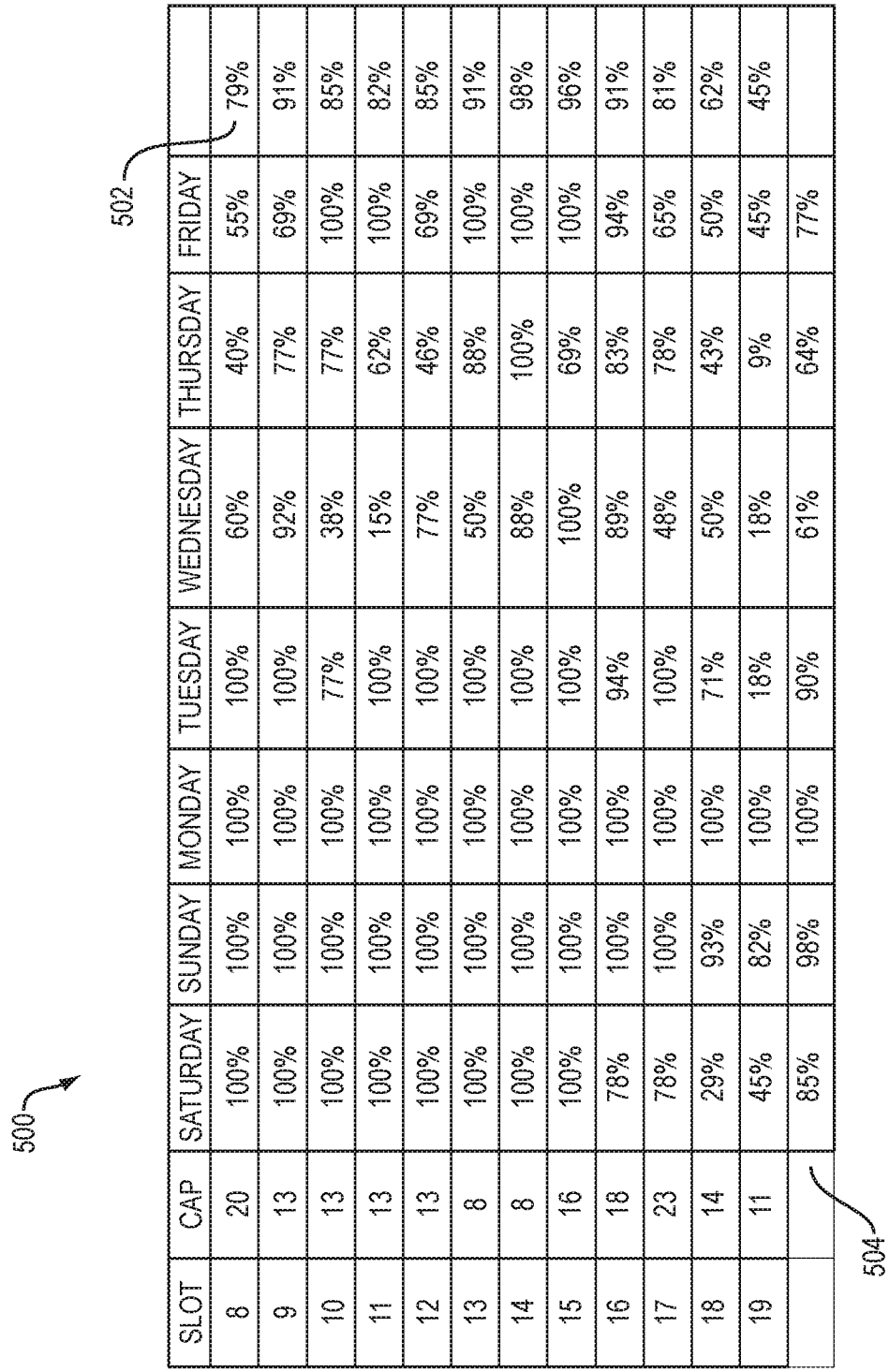
FIG. 5 is a table showing slots, capacities, and utilization rates before implementing slot to slot smoothing, according to an example embodiment.

Referring now to FIG. 5, a table data structure 500 of utilization after the slot capacity process has been run, but before the smoothing process has been run. A last column 502 is the average capacity for the time slot across the days of the week. The last row 504 across the bottom of the table is the average capacity of all time slots for the day.

Table data structure 600 of FIG. 6 is a table of utilization after the smoothing process has been run. A last column 602 is the average capacity for the time slot across the days of the week. The last row 604 across the bottom of the table is the average capacity of all time slots for the day. The smoothing process adjusts the capacity values such that a slot-to-slot variance of no more than 3 units is met.

In table data structure 500 the variance in capacity from slot 8 to slot 9 is 7. This is above the slot-to-slot variance threshold. To correct for this, as shown in table 600, the smoothing process changes the capacity for slot 8 from 20 to 18 and the capacity for slot 9 from 13 to 15. The variance between capacities for slot 8 to slot 9 is now 3. Similarly, the variance in capacity from slot 12 to slot 13 is 5. This is above the slot-to-slot variance threshold. To correct this, as shown in table data structure 600, the smoothing process changes the capacity for slot 12 from 13 to 12 and the capacity for slot 13 from 8 to 9. The variance in capacity from slot 14 to slot 15 is 8. The smoothing process changes the capacity for slot 14 from 8 to 12 and the capacity for slot 15 from 16 to 15. The variance in capacity from slot 16 to slot 17 is 5. The smoothing process changes the capacity for slot 17 to 18. The variance in capacity from slot 17 to slot 18 is 9. The smoothing process changes the capacity for slot 17 from 23 to 18 and the capacity for slot 18 from 14 to 15. The capacity for slot 19 has been changed from 11 to 12. This table is the end result of the process.

The average slot capacity for a day (row 604) has not changed for Friday to Thursday between table 500 and table 600, and the average slot capacity for Friday changed from 77 percent to 78 percent. The slot capacity of slot 8 changed from 79 percent to 82 percent. The slot capacity of slot 9 changed from 91 percent to 87 percent. The slot capacity of slot 10 was unchanged. The slot capacity of slot 11 changed from 82 percent to 85 percent. The slot capacity of slot 12 changed from 85 percent to 87 percent. The slot capacity of slot 13 changed from 91 percent to 87 percent. The slot capacity of slot 14 changed from 98 percent to 90 percent. The slot capacity of slot 15 changed from 96 percent to 90 percent. The slot capacity of slot 16 changed from 91 percent to 92 percent. The slot capacity of slot 17 changed from 81 percent to 93 percent. The slot capacity of slot 18 was unchanged. The slot capacity of slot 19 changed from 45 percent to 43 percent.

Figure 7:
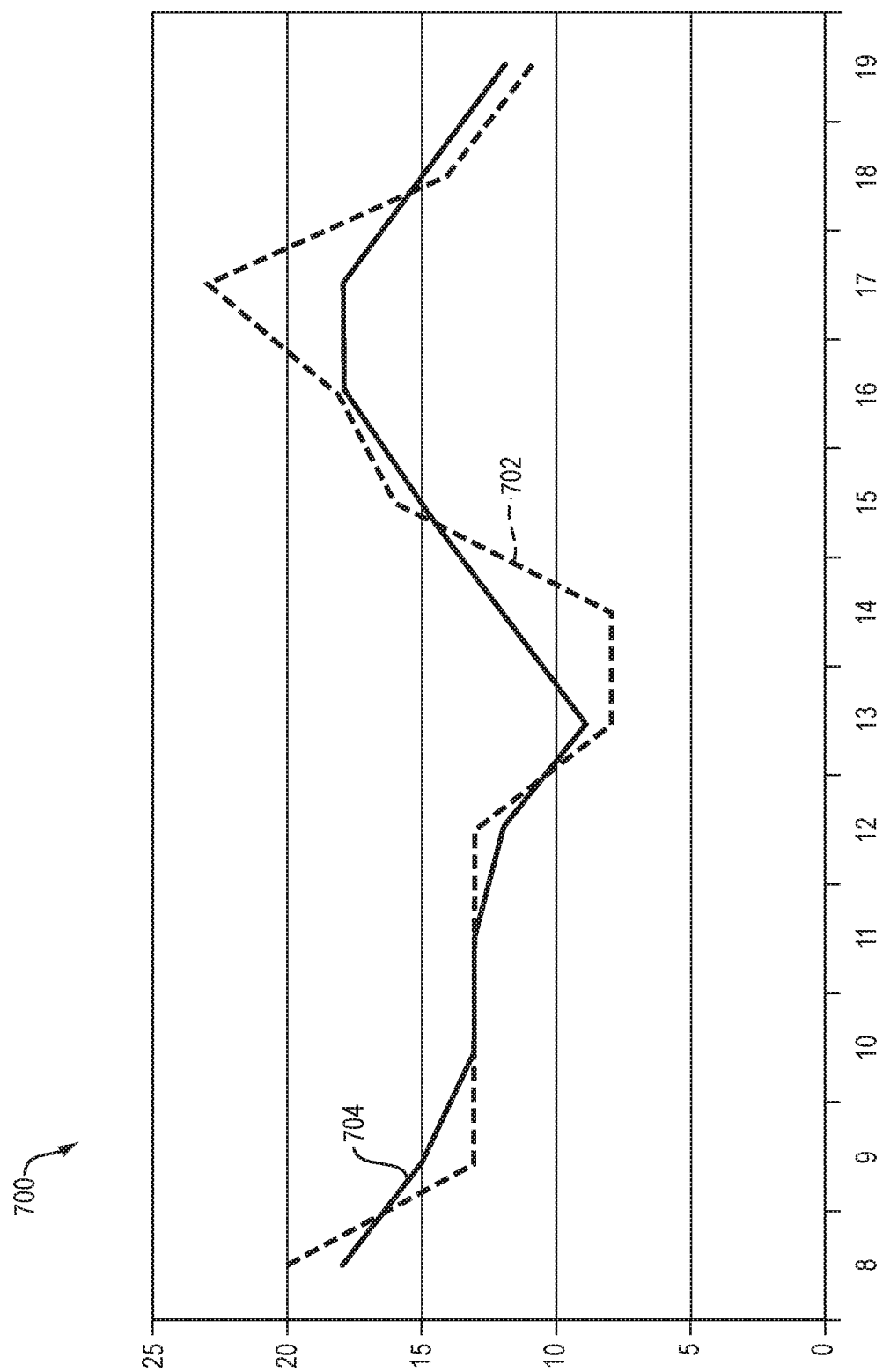
FIG. 7 is a graph showing capacity versus time slots before and after implementing slot to slot smoothing according to an example embodiment.

FIG. 7 shows a graph 700 having a vertical axis of capacity and a horizontal access of time slots. Line 702 shows the capacity values over time before running the smoothing process, and has several large slope and amplitude changes. Line 704 shows the capacity values over time after running the smoothing process, and shows how the amplitude and slope have been changed to a line having smaller peaks and less abrupt slope changes.

Figure 8A:
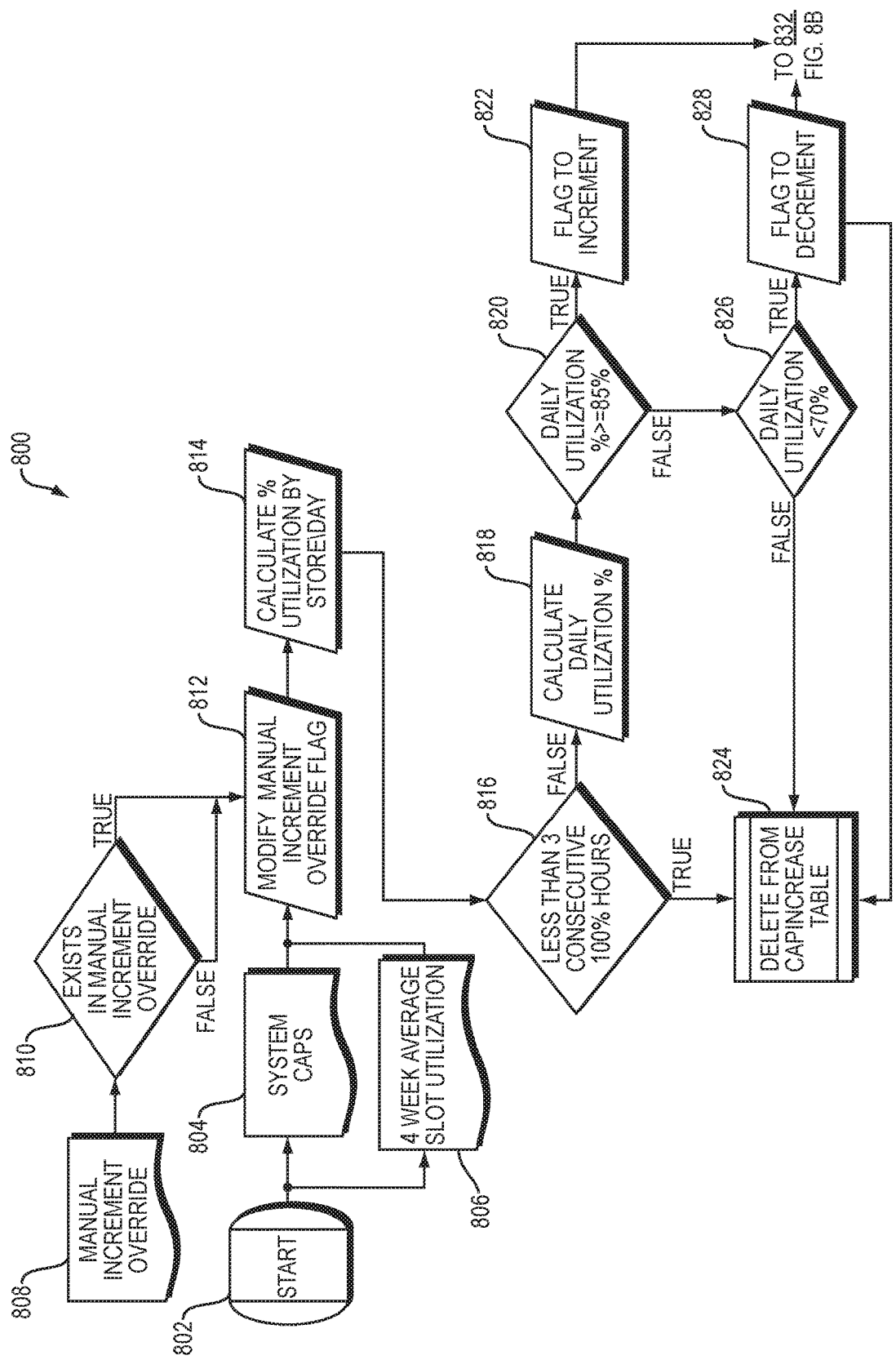
FIGS. 8A to 8C are a flow diagram for a method of slot capacity optimization, according to an example embodiment.
Figure 8B:
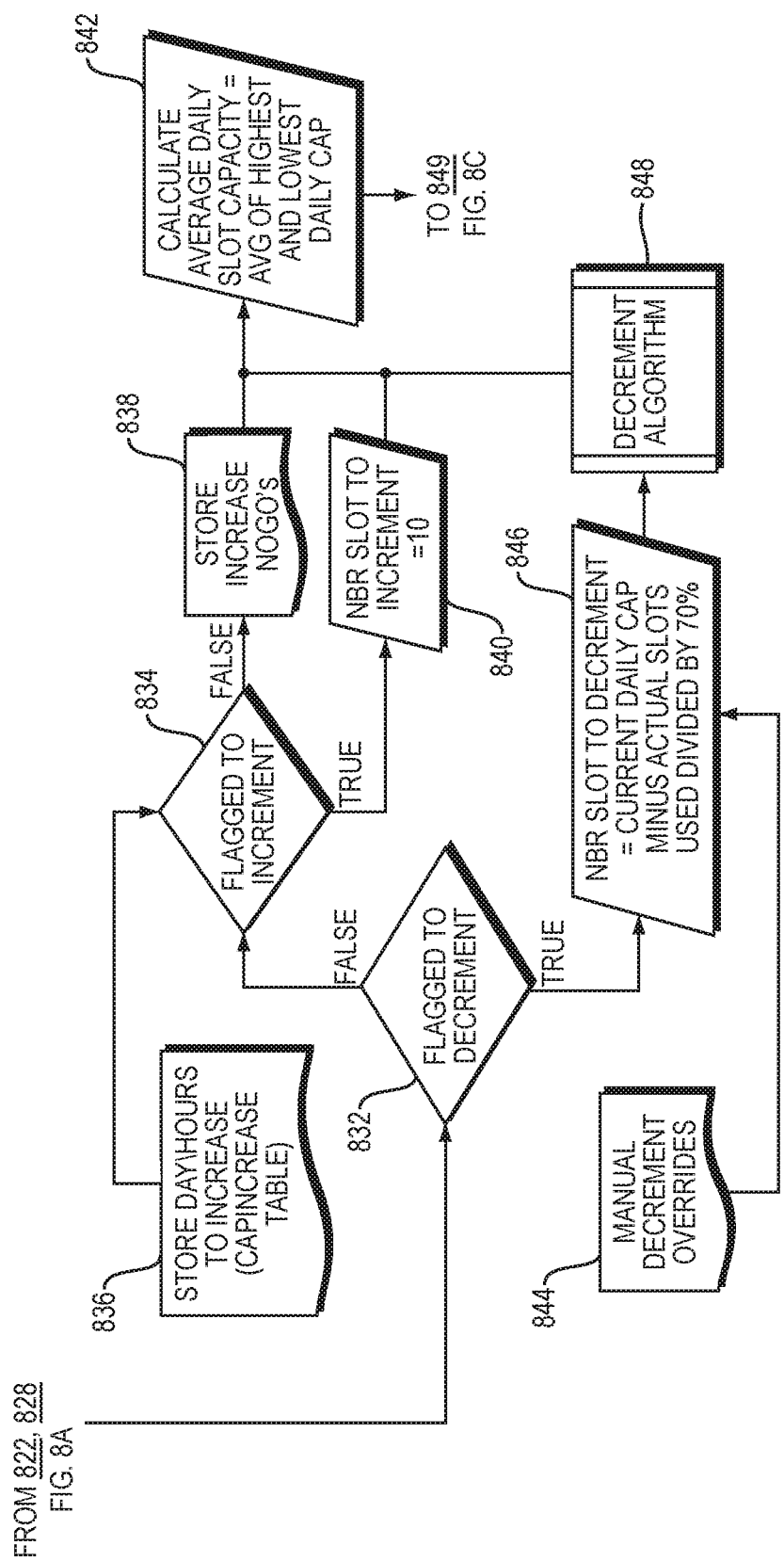
Figure 8C:
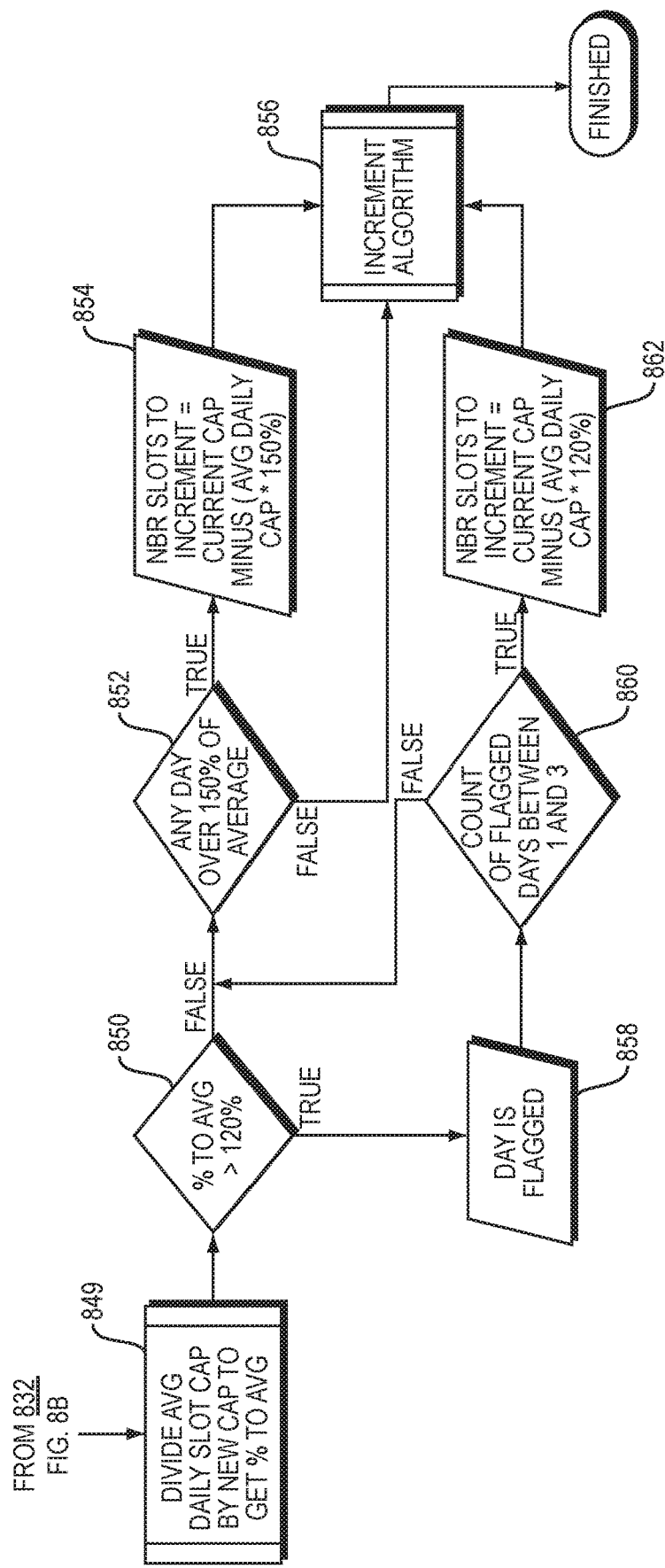

FIGS. 8A to 8C are flow diagrams showing a particular embodiment of a method 800 for time slot adjustment that can be executed by an embodiment of the environment 100. The method starts at block 802 and proceeds to block 804 where system capacities are determined based on historical data and one or more capacity adjustment table data structures are generated. Block 806 shows that historical utilization data averaged over a specified time period, e.g., the prior four week average slot utilization, is used. At block 808, a manual increment override can be received from a user device for one or more time slots in the one or more capacity adjustment table data structures, and decision block 810 determines if the manual increment override exists.

Block 812 shows the modify manual increment override flag may be set in the one or more capacity adjustment table data structures for one or more time slots based on the received manual increment override. Block 814 shows the utilization by store/day is calculated taking into account the manual override increment if flagged, and the system capacities from block 804. At decision block 816 a determination is made regarding whether a day has less than three consecutive 100 percent hours. If this is true, than the day is deleted from a capacity increase table data structure (e.g., one of the one or more capacity adjustment table data structures, shown in block 824. When a day does not have less than three consecutive 100 percent hours, then block 818 is executed where a daily utilization percentage is calculated.

Decision block 820 determines whether the daily utilization rate is greater than or equal to 85 percent. When the daily utilization rate is greater than or equal to 85 percent a flag to increment the capacities for that day is set in the capacity increase table data structures, shown in block 822. On the other hand, when the daily utilization rate is not greater than or equal to 85 percent another determination is made at decision block 826, where it is determined whether the daily utilization rate is less than 70 percent. When the daily utilization rate is less than 70 percent, then the day is deleted from the capacity increase table data structure 824. When the daily utilization rate is less than 70 percent a flag to decrement the capacities for that day is set in the one or more capacity adjustment table data structures, shown in block 828. When a daily capacity utilization rate is between 85 percent and 70 percent, the current capacities of the time slots in a specified day may be maintained.

Processing continues at decision block 832 where a determination is made regarding whether the decrement flag has been set. When the decrement flag has not been set, then a determination is made at decision block 834 regarding whether the increment flag has been set. Also taken into account is information regarding the capacity increase table data structure, shown in block 836. When the increment flag has not been set then the capacity of a facility is not increased, shown in block 838.

When the result of decision block 832 is that the increment flag has been set for a time slot, then processing block 840 shows the time slot is incremented. Processing block 842 shows wherein the average daily time slot capacity is set to the average of the highest and lowest daily capacity.

When the result of decision block 832 is that the decrement flag has been set for a time slow, then block 846 is executed. At block 846, the time slot is decremented according to a formula wherein the current daily capacity minus the utilized slot capacity is divided by 70 percent. This block also takes into account any manual decrement overrides, shown in block 844. The output of block 846 is provided to block 848 which executes a decrement algorithm. The output of this block is fed to block 842.

Block 849 divides the average daily slot capacity by the new slot capacity to determine a percentage to the average. Decision block 850 determines whether the percentage to average is greater than 120 percent. When the result is not greater than 120 percent, decision block 852 is executed to determine if any day is over 150 percent of average. When the result is that there is a day over 150 percent of average then block 854 is executed wherein a number of slots to increment is equal to the current cap minus the value of the average daily cap multiplied by 150 percent. The output of block 854 is provided to the increment algorithm shown in block 856.

Referring back to block 850, when the percentage to average is greater than 120 percent then the day is flagged, shown in in block 858. At decision block 860 a determination is made regarding the number of flagged days. When the count of flagged days is between one and three then block 862 is executed wherein the number of slots to increment is the current capacity minus the value of the average daily capacity multiplied by 120 percent. This result is fed to the increment algorithm block 856. The output of the increment algorithm results in a new capacity table and the process is finished.

Further capacity adjustment can take place by way of a tool referred to herein as Captimus Adaptive Step-up Tool (CAST) wherein field associates influence capacity changes for online grocery pickup operations. The tool adapts the capacity change based on the preference used by the field associate and the current capacity of the store to recommend increases in capacity that would increase sales volume while increasing the likelihood of the recommendation being accepted by store leadership. The capacity recommendations are based on historic sales data, sales forecast, and historic customer pickup trends.

In a non-limiting embodiment, the tool comprises a web application and backend software. The web application pulls data from a backend database based on the store chosen by the user and allows the user to select a preferred "step up curve". The selected step up curve is fed to backend software which can use the selected step up curve to determine how aggressive the Captimus software should be when recommending an increase in order capacity for that chosen store. The recommendation is based on previous step ups not rejected, historical customer adoption of new slot capacity, store performance metrics, and current slot utilization data. The tool uses store, day and time slot specific data to determine optimum capacity. The tool also uses store specific performance metrics, including labor guidelines, to ensure recommended capacity can be supported by the store. The tool also uses human recommendation to adapt to capacity changes to store and market specific needs to ensure approval before implementation.

Figure 9:
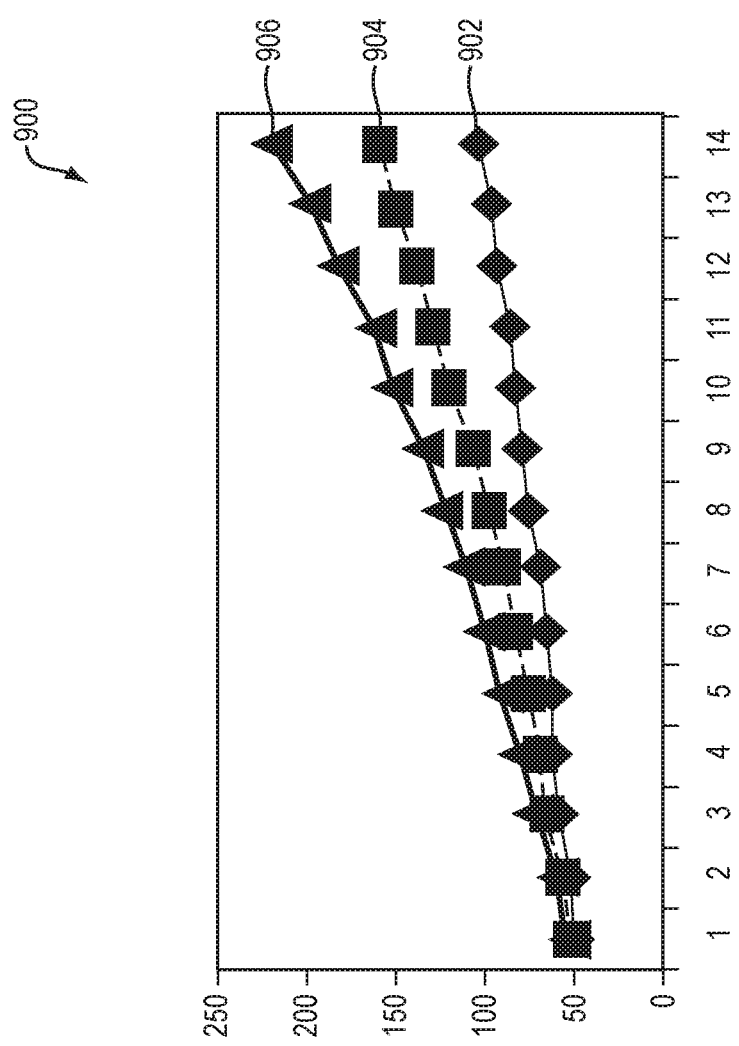
FIG. 9 is a graph showing orders per week versus weeks for different step up curves according to an example embodiment.

The user is able to select a step up curve option from three different step up curves. These are shown in the graph 900 of FIG. 9. In the graph 900, the vertical axis is orders per week, while the horizontal axis is weeks. A conservative step up is shown by line 902, wherein a store can step up by no more than 5 percent of the current maximum day's daily capacity. Line 904 shows a normal step up, wherein stores with capacity less than or equal to 100 can step up by no more than 10 percent of the current maximum day's daily capacity, and wherein stores with capacity greater than 100 can step up by no more than 10 orders per day.

Figure 10:
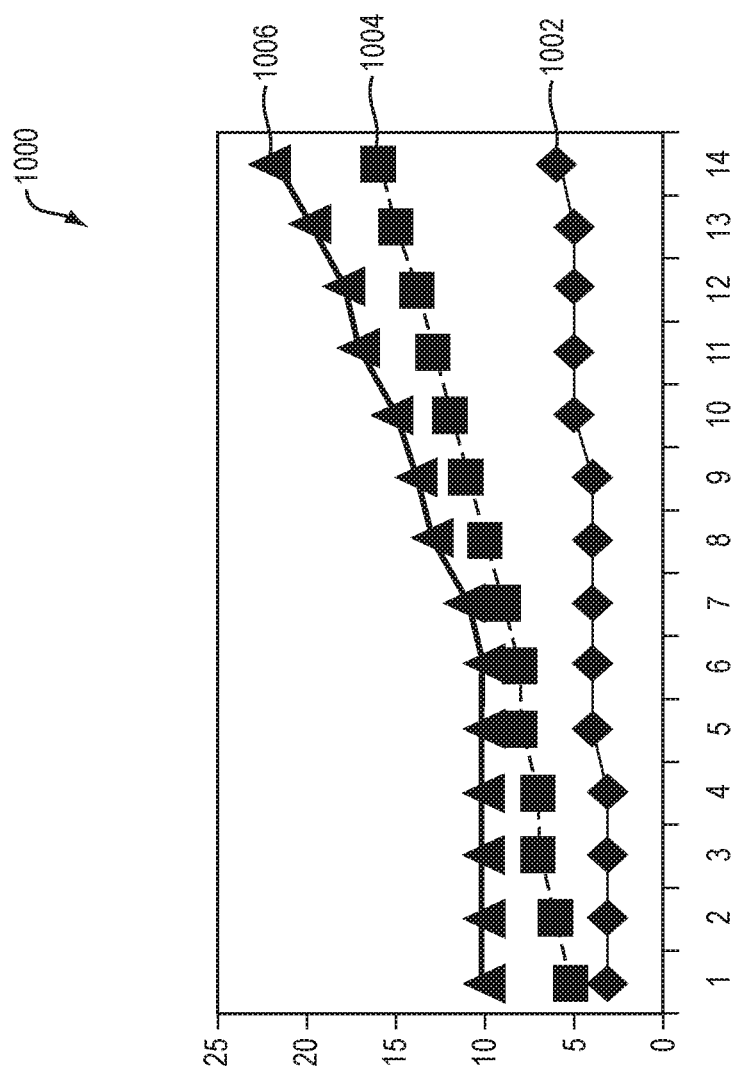
FIG. 10 is a graph showing maximum orders per day versus weeks for different step up curves according to an example embodiment.

Graph 1000 of FIG. 10 shows a graph wherein in the vertical axis is maximum number of orders per day, and a horizontal axis of weeks. Here the conservative step up line is line 1002, the normal step up line is line 1004, and the aggressive step up line is line 1006.

This tool allows the user to determine how Captimus "adapts step-ups" based on the store's current capacity. The field has control over how aggressive Captimus increases capacity, the curve, through the automated step-up process. Rather than rejecting step-ups that are too "big", a user can set the stores curve to "conservative" using this tool and Captimus will reduce the number of slots, or amount of capacity, that is added to the store during a Captimus cycle.

Figure 11:
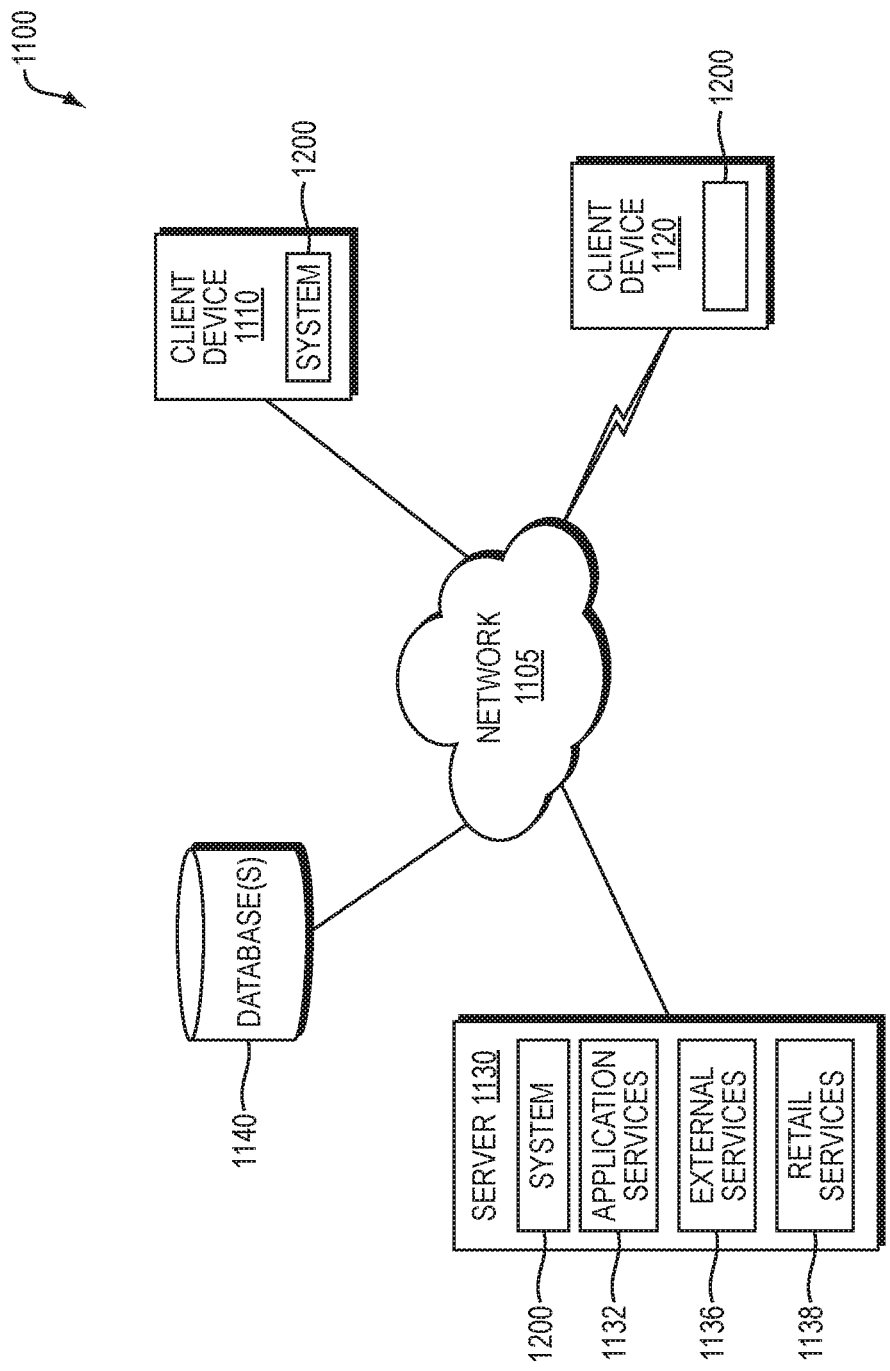
FIG. 11 is a diagram of an exemplary network environment suitable for a slot capacity optimization according to an exemplary embodiment.

FIG. 11 illustrates a network diagram depicting a system 1100 for implementing the time slot adjustment system, according to an example embodiment. The system 1100 can include a network 1105, multiple client devices, for example, client device 1110, client device 1120, a server 1130, and database(s) 1140. Each of the client devices 1110, 1120, server 1130, and database(s) 1140 is in communication with the network 1105.

In an example embodiment, one or more portions of network 1105 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

The client devices 1110, 1120 may comprise, but are not limited to, mobile devices, hand-held devices, wireless devices, portable devices, wearable computers, cellular or mobile phones, portable digital assistants (PDAs), smart phones, smart watches, tablets, ultrabooks, netbooks, laptops, desktops, multi-processor systems, microprocessor-based or programmable consumer electronics, and the like. Each of client devices 1110, 1120 may connect to network 1105 via a wired or wireless connection. In an example embodiment, the client devices 1110, 1120 may perform one or more of the functionalities of the time slot adjustment environment 100 described herein, or transmit data or signals to the time slot adjustment environment 100 described herein. The client device 1110, 1120 can include one or more components of computing device 1200 of FIG. 12.

In an example embodiment, the time slot adjustment environment 100 may be included at least in part on the client device 1110, 1120, and the client device 1110, 1120 performs one or more of the functionalities of the system described herein. In an example embodiment, the time slot adjustment environment 100 may be included at least in part on the server 1130, and the server 1130 performs one or more of the functionalities of the computing device 1200 described herein. For example, the different environment components such as CASPR 102, Captimus capacity optimization component 118 as well as scheduling tools (components 128, 130, 132, 134, 136, and 138) may be realized at least in part by one or more of client devices 1110 and 1120.

The database(s) 1140 comprise one or more storage devices for storing data and/or instructions (or code) for use by the server 1130 and/or the client devices 1110, 1120. Each of the database(s) 1140 and the server 1130 is connected to the network 1105 via a wired connection. Alternatively, one or more of the database(s) 1140 and server 1130 may be connected to the network 1105 via a wireless connection. The server 1130 comprise one or more computers or processors configured to communicate with the client devices 1110, 1120 via network 1105. The server 1130 can include one or more components of the computing device 1200 of FIG. 12. Server 1130 hosts one or more software systems, applications or websites, including one or more components of the computing device 1200 described herein and/or facilitates access to the content of database(s) 1140.

In an example embodiment, the server 1130 also includes various software services that facilitate the functionalities of the time slot adjustment environment 100. Database(s) 1140 and server 1130 may be located at one or more geographically distributed locations from each other or from client devices 1110, 1120. Alternatively, database(s) 1140, 1145 may be included within server 1130.

Figure 12:
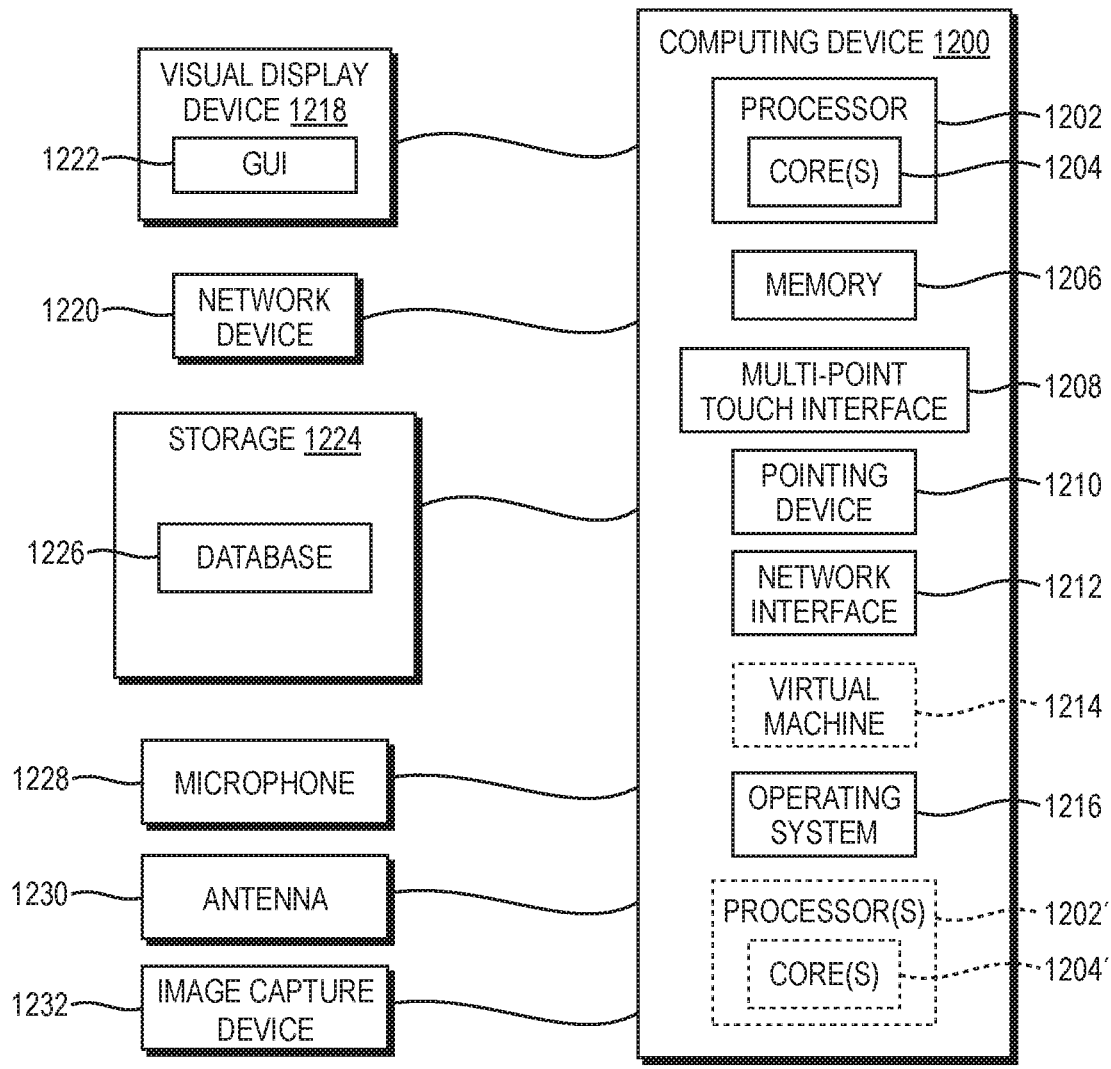
FIG. 12 is a block diagram of an exemplary computing device that may be used to implement exemplary embodiments described herein.

FIG. 12 is a block diagram of an exemplary computing device 1200 that can be used to perform one or more steps of the methods provided by exemplary embodiments. For example, computing device 1200 may be the client device 1110, 1120 and the server 1130 as described in FIG. 11. The computing device 1200 includes one or more non-transitory computer-readable media for storing one or more computer-executable instructions or software for implementing exemplary embodiments. The non-transitory computer-readable media can include, but are not limited to, one or more types of hardware memory, non-transitory tangible media (for example, one or more magnetic storage disks, one or more optical disks, one or more USB flashdrives), and the like. For example, memory 1206 included in the computing device 1200 can store computer-readable and computer-executable instructions or software for implementing exemplary embodiments. The computing device 1200 also includes processor 1202 and associated core 1204, and optionally, one or more additional processor(s) 1202' and associated core(s) 1204' (for example, in the case of computer systems having multiple processors/cores), for executing computer-readable and computer-executable instructions or software stored in the memory 1206 and other programs for controlling system hardware. Processor 12902 and processor(s) 1202' can each be a single core processor or multiple core (704 and 1204') processor.

Virtualization can be employed in the computing device 1200 so that infrastructure and resources in the computing device can be shared dynamically. A virtual machine 1214 can be provided to handle a process running on multiple processors so that the process appears to be using only one computing resource rather than multiple computing resources. Multiple virtual machines can also be used with one processor.

Memory 1206 can include a computer system memory or random access memory, such as DRAM, SRAM, EDO RAM, and the like. Memory 1206 can include other types of memory as well, or combinations thereof. An individual can interact with the computing device 1200 through a visual display device 1218, such as a touch screen display or computer monitor, which can display one or more graphical user interfaces 1222 for receiving data from the individual (e.g., order data and travel data). The visual display device 1218 can also display other aspects, elements and/or information or data associated with exemplary embodiments. The computing device 1200 can include other I/O devices for receiving input from a individual, for example, a keyboard or another suitable multi-point touch interface 1208, a pointing device 1210 (e.g., a pen, stylus, mouse, or trackpad). The keyboard 1208 and the pointing device 1210 can be coupled to the visual display device 1218. The computing device 1200 can include other suitable conventional I/O peripherals.

The computing device 1200 can also include one or more storage devices 1224, such as a hard-drive, CD-ROM, or other computer readable media, for storing data and computer-readable instructions and/or software, such as one or more modules of the environment 100 shown in FIG. 1 that implements exemplary embodiments of the notification system as described herein, or portions thereof, which can be executed to generate the graphical user interface 1222 on the visual display 1218. Exemplary storage device 1224 can also store one or more databases for storing suitable information required to implement exemplary embodiments. The databases can be updated by an individual or automatically at a suitable time to add, delete, or update one or more items in the databases. Exemplary storage device 1224 can store one or more databases 1226 for storing provisioned data, and other data/information used to implement exemplary embodiments of the systems and methods described herein.

The computing device 1200 can include a network interface 1212 configured to interface via one or more network devices 1222 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 1212 can include a built-in network adapter, network interface card, PCMCIA network card, card bus network adapter, wireless network adapter, USB network adapter, modem or another device suitable for interfacing the computing device 1200 to a type of network capable of communication and performing the operations described herein. Moreover, the computing device 1200 can be a computer system, such as a workstation, desktop computer, server, laptop, handheld computer, tablet computer (e.g., the iPad® tablet computer), mobile computing or communication device (e.g., the iPhone® communication device), or other form of computing or telecommunications device that is capable of communication and that has sufficient processor power and memory capacity to perform the operations described herein.

The computing device 1200 can run an operating system 1216, such as versions of the Microsoft® Windows® operating systems, the different releases of the Unix and Linux operating systems, a version of the MacOS® for Macintosh computers, an embedded operating system, a real-time operating system, an open source operating system, a proprietary operating system, an operating systems for mobile computing devices, or another operating system capable of running on the computing device and performing the operations described herein. In exemplary embodiments, the operating system 1216 can be run in native mode or emulated mode. In an exemplary embodiment, the operating system 1216 can be run on one or more cloud machine instances.

Figure 13:
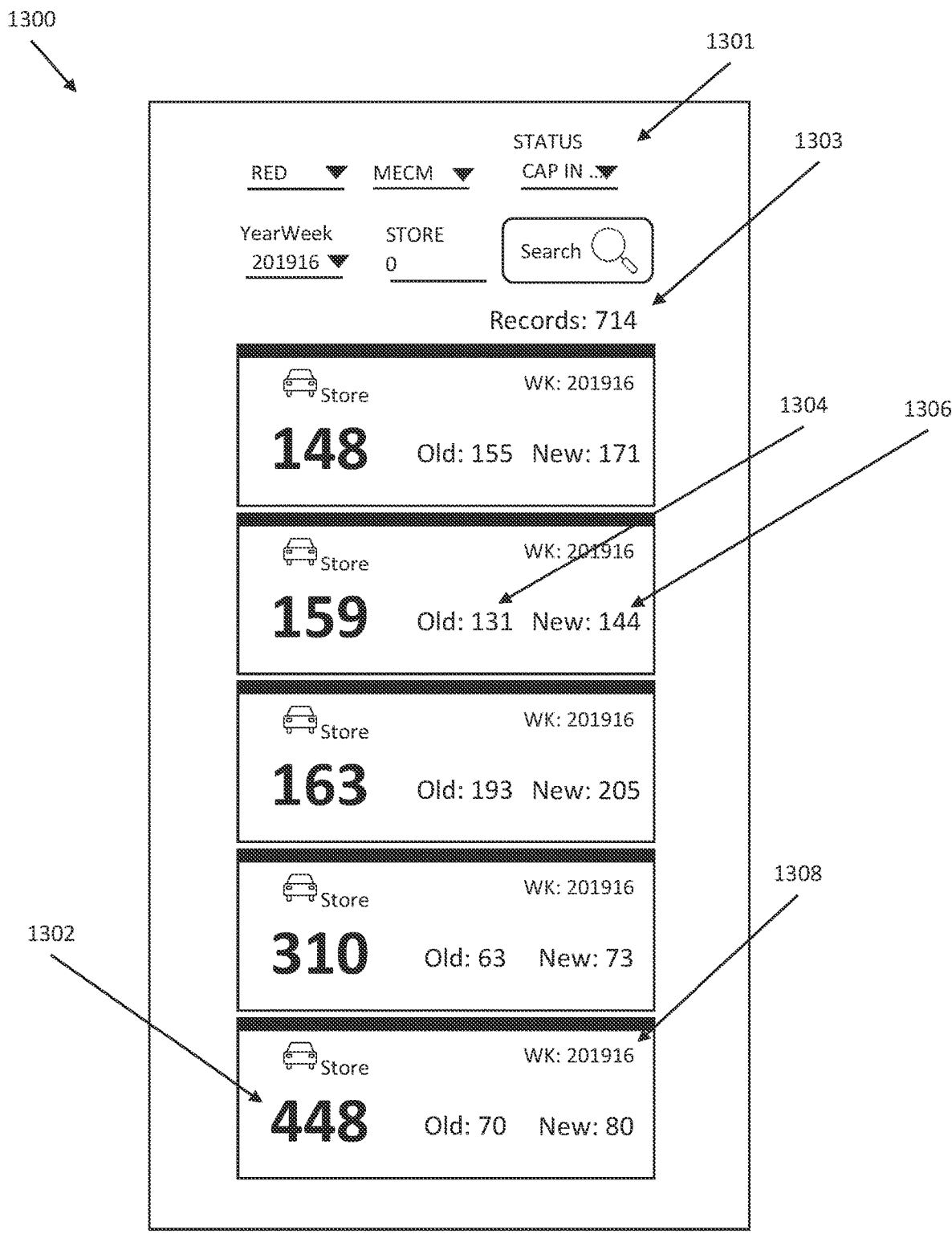
FIG. 13 is a search screen interface for recommendations, according to an example embodiment.

FIG. 13 is a search screen interface 1300 for searching and viewing capacity recommendations, according to an example embodiment. The interface 1300 includes a search option 1301, for example, for searching stores with capacity increase recommendations. An identifier 1302 displays a store identifier associated with a store. For each store, an old capacity 1304 and a new capacity 1306 is displayed. The interface 1300 further displays an identifier 1303 for a number of stores where the maximum capacity is increasing, and a year/week identifier 1308.

FIG. 14 is a review interface 1400 for viewing recommendations, according to an example embodiment. For a predefined store (identified by a store identifier 1401), section 1402 of interface 1400 displays new capacity recommendations by day of week, based on the store's performance, customer demand, and physical capacity. Section 1404 of interface 1400 displays performance statistics.

FIG. 15 is an interface 1500 for step up preferences, according to an example embodiment. Interface 1500 enables a user to change and/or determine how aggressive or conservative to make the step-up recommendation.

Interfaces 1300, 1400, and 1500 may each be a user interface, e.g., rendered by a website hosted by a server accessed by an application, which can be a web browser.

The description is presented to enable a person skilled in the art to create and use a computer system configuration and related method and systems for dynamic delivery scheduling. Various modifications to the example embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention may be practiced without the use of these specific details. In other instances, well-known structures and processes are shown in block diagram form in order not to obscure the description of the invention with unnecessary detail. Thus, the present disclosure is not intended to be limited to the embodiments shown, but is to be accorded the widest scope consistent with the principles and features disclosed herein.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps can be replaced with a single element, component, or step. Likewise, a single element, component, or step can be replaced with a plurality of elements, components, or steps that serve the same purpose. Moreover, while exemplary embodiments have been shown and described with references to particular embodiments thereof, those of ordinary skill in the art will understand that various substitutions and alterations in form and detail can be made therein without departing from the scope of the invention. Further still, other aspects, functions, and advantages are also within the scope of the invention.

Exemplary flowcharts have been provided herein for illustrative purposes and are non-limiting examples of methods. One of ordinary skill in the art will recognize that exemplary methods can include more or fewer steps than those illustrated in the exemplary flowcharts, and that the steps in the exemplary flowcharts can be performed in a different order than the order shown in the illustrative flowcharts.

Having described certain embodiments, which serve to illustrate various concepts, structures, and techniques sought to be protected herein, it will be apparent to those of ordinary skill in the art that other embodiments incorporating these concepts, structures, and techniques may be used. Elements of different embodiments described hereinabove may be combined to form other embodiments not specifically set forth above and, further, elements described in the context of a single embodiment may be provided separately or in any suitable sub-combination. Accordingly, it is submitted that the scope of protection sought herein should not be limited to the described embodiments but rather should be limited only by the spirit and scope of the following claims.

What is claimed is:

1. A system for adjustment of capacity of a retail facility for responding to electronic orders received via a network from user devices, the system comprising:
   one or more computer-readable media storing a plurality of data structures associated with the capacity of the retail facility for responding to the electronic orders received via the network from the user devices; and
   a computing device including a processor-based control circuit and a visual display, the control circuit of the computing device being configured to execute a slot capacity module, wherein the slot capacity module, when executed:
      reads a first one of the plurality of data structures to determine a utilization rate of the retail facility for time slots for a plurality of days, the utilization rate being based on a prior history of utilization rates collected over a pre-determined period of time;
      creates a second one of the plurality of data structures that identifies candidate time slots for which capacity is subject to modification based on the utilization rate associated with each of the time slots or each of the time slots for a specified day;
      modifies the second one of the plurality of data structures to at least one of remove a first subset of the candidate time slots, associate an increment flag with a second subset of the candidate time slots, or associate a decrement flag with a third subset of the candidate time slots;
      modifies a third one of the plurality of data structures to adjust the capacity for the candidate time slots associated with the increment or decrement flag;
      adjusts, in the third one of the plurality of data structures, the capacity for a fourth subset of the candidate time slots having a slot-to-slot capacity variance that exceeds a smoothing threshold;
      generates a recommended capacity schedule for the retail facility;
      generates, on the visual display, a user-modifiable graphical interface configured to permit a user to manually configure adaptive step-up processes that control how the computing device implements a capacity increase for the time slots at the retail facility for the plurality of days, wherein the user modifiable graphical interface includes input fields permitting the user to select a conservative capacity increase step-up process, a normal capacity increase step-up process, or an aggressive capacity increase step-up process; and
      transmits a signal to the visual display to generate, on the visual display, a modifiable graphical user interface including electronic data representing:
         an identifier of the retail facility;
         an indicator of a current number of the time slots reflecting a current capacity of the retail facility;
         an indicator of a recommended number of the time slots reflecting the recommended capacity schedule of the retail facility; and
         an indicator of a time period associated with the recommended capacity schedule.

2. The system of claim 1, wherein the second subset of the candidate time slots associated with the increment flag have a utilization rate that is greater than at least 85 percent.

3. The system of claim 1, wherein the third subset of the candidate time slots associated with the decrement flag have a utilization rate that is less than 70 percent.

4. The system of claim 1, wherein adjustment of the capacity for the candidate time slots having the slot-to-slot capacity variance that exceeds the smoothing threshold comprises adjusting capacity values of the time slots adjacent to the candidate time slots in the fourth subset such that a capacity difference between the time slots does not exceed the smoothing threshold.

5. The system of claim 4, wherein the smoothing threshold comprises a value of 3.

6. The system of claim 5,
   wherein the conservative capacity increases capacity by 5 percent or less of a current maximum daily capacity;
   wherein the normal capacity increase for stores having a capacity of 100 orders or less increases capacity by 10 percent or less of a current maximum daily capacity, and for stores having a capacity of more than 100 orders increases capacity by 10 orders or less per day; and
   wherein the aggressive capacity increase for stores having a capacity of 100 orders or less increases capacity by 10 orders or less per day, and for stores having a capacity of more than 100 orders increases capacity by 10 percent or less of a current maximum daily capacity.

7. The system of claim 1 wherein the recommended capacity schedule is used for handling electronic orders associated with groceries.

8. A computer-implemented method for adjustment of capacity of a retail facility for responding to electronic orders received via a network from user devices, the method comprising:
   providing a computing device including a processor-based control circuit and a visual display; and
   by the control circuit of the computing device and via a slot capacity module:
      reading, via the slot capacity module, a first one of a plurality of data structures to determine a utilization rate of the retail facility for time slots for a plurality of days, the utilization rate being based on a prior history of utilization rates collected over a pre-determined period of time;
      creating a second one of the plurality of data structures that identifies candidate time slots for which capacity is subject to modification based on the utilization rate associated with each of the time slots or each of the time slots for a specified day;
      modifying the second one of the plurality of data structures to at least one of remove a first subset of the candidate time slots, associate an increment flag with a second subset of the candidate time slots, or associate a decrement flag with a third subset of the candidate time slots;
      modifying a third one of the plurality of data structures to adjust the capacity for the candidate time slots associated with the increment or decrement flag;
      adjusting, in the third one of the plurality of data structures, the capacity for a fourth subset of the candidate time slots having a slot-to-slot capacity variance that exceeds a smoothing threshold;
      generating a recommended capacity schedule for the retail facility;
      generating, on the visual display, a user-modifiable graphical interface configured to permit a user to manually configure adaptive step-up processes that control how the computing device implements a capacity increase for the time slots at the retail facility for the plurality of days, wherein the user modifiable graphical interface includes input fields permitting the user to select a conservative capacity increase step-up process, a normal capacity increase step-up process, or an aggressive capacity increase step-up process; and transmitting a signal to the visual display to generate, on the visual display, a modifiable graphical user interface including electronic data representing:
an identifier of the retail facility;
an indicator of a current number of the time slots reflecting a current capacity of the retail facility;
an indicator of a recommended number of the time slots reflecting the recommended capacity schedule of the retail facility; and
an indicator of a time period associated with the recommended capacity schedule.

9. The method of claim 8, wherein the second subset of the candidate time slots associated with the increment flag have a utilization rate that is greater than at least 85 percent.

10. The method of claim 8, wherein the third subset of the candidate time slots associated with the decrement flag have a utilization rate that is less than 70 percent.

11. The method of claim 8, wherein adjustment of the capacity for the candidate time slots having the slot-to-slot capacity variance that exceeds the smoothing threshold comprises adjusting capacity values of the time slots adjacent to the candidate time slots in the fourth subset such that a capacity difference between the time slots does not exceed the smoothing threshold.

12. The method of claim 11, wherein the smoothing threshold comprises a value of 3.

13. The method of claim 12,
wherein the conservative capacity increases capacity by 5 percent or less of a current maximum daily capacity;
wherein the normal capacity increase for stores having a capacity of 100 orders or less increases capacity by 10 percent or less of a current maximum daily capacity and for stores having a capacity of more than 100 orders increases capacity by 10 orders or less per day; and
wherein the aggressive capacity increase for stores having a capacity of 100 orders or less increases capacity by 10 orders or less per day and for stores having a capacity of more than 100 orders increases capacity by 10 percent or less of a current maximum daily capacity.

14. The method of claim 8, wherein the recommended capacity schedule is used for handling electronic orders associated with groceries.

15. A non-transitory machine-readable medium storing instructions executable by a computing device, wherein execution of the instructions causes the computing device to implement a method for adjustment of capacity of a retail facility for responding to electronic orders received via a network from user devices, the method comprising:

providing a computing device including a processor-based control circuit and a visual display; and by the control circuit of the computing device and via a slot capacity module:
reading, via the slot capacity module, a first one of a plurality of data structures to determine a utilization rate of the retail facility for time slots for a plurality of days, the utilization rate being based on a prior history of utilization rates collected over a pre-determined period of time;
creating a second one of the plurality of data structures that identifies candidate time slots for which capacity is subject to modification based on the utilization rate associated with each of the time slots or each of the time slots for a specified day;
modifying the second one of the plurality of data structures to at least one of remove a first subset of the candidate time slots, associate an increment flag with a second subset of the candidate time slots, or associate a decrement flag with a third subset of the candidate time slots;
modifying a third one of the plurality of data structures to adjust the capacity for the candidate time slots associated with the increment or decrement flag;
adjusting, in the third one of the plurality of data structures, the capacity for a fourth subset of the candidate time slots having a slot-to-slot capacity variance that exceeds a smoothing threshold;
generating a recommended capacity schedule for the retail facility;
generating, on the visual display, a user-modifiable graphical interface configured to permit a user to manually configure adaptive step-up processes that control how the computing device implements a capacity increase for the time slots at the retail facility for the plurality of days, wherein the user modifiable graphical interface includes input fields permitting the user to select a conservative capacity increase step-up process, a normal capacity increase step-up process, or an aggressive capacity increase step-up process; and
transmitting a signal to the visual display to generate, on the visual display, a modifiable graphical user interface including electronic data representing:
an identifier of the retail facility;
an indicator of a current number of the time slots reflecting a current capacity of the retail facility;
an indicator of a recommended number of the time slots reflecting the recommended capacity schedule of the retail facility; and
an indicator of a time period associated with the recommended capacity schedule.

* * * * *